United States Patent [19]

Mao et al.

[11] 3,988,165
[45] Oct. 26, 1976

[54] METHOD OF MAKING A LEAD-ACID STORAGE BATTERY, AND CELL, CAPABLE OF ACTIVATION BY THE ADDITION OF ELECTROLYTE

[75] Inventors: George W. Mao; Anthony Sabatino, both of St. Paul, Minn.

[73] Assignee: Gould Inc., Rolling Meadows, Ill.

[22] Filed: Oct. 6, 1975

[21] Appl. No.: 620,002

Related U.S. Application Data

[60] Division of Ser. No. 486,663, July 8, 1974, which is a continuation-in-part of Ser. No. 377,525, July 9, 1973, abandoned.

[52] U.S. Cl............................... 29/623.2; 204/2.1
[51] Int. Cl.²......................................... H01M 4/16
[58] Field of Search ............... 136/27, 26, 112, 76, 136/153, 154

[56] References Cited
UNITED STATES PATENTS

| | | |
|---|---|---|
| 1,944,065 | 1/1934 | Chamberlain.................. 136/26 |
| 2,938,063 | 5/1960 | Greenburg et al................. 136/26 |
| 3,258,360 | 6/1966 | Kordesch........................ 136/26 X |
| 3,598,653 | 8/1971 | Fukuda et al..................... 136/26 |
| 3,607,408 | 9/1971 | Duddy .......................... 136/26 |
| 3,839,089 | 10/1974 | Duddy .......................... 136/26 |

*Primary Examiner*—John H. Mack
*Assistant Examiner*—C. F. Lefevour
*Attorney, Agent, or Firm*—Leydig, Voit, Osann, Mayer & Holt, Ltd.

[57] ABSTRACT

A method of fashioning a lead-acid storage battery capable of being stored after completing of the battery processing and thereafter activated by the addition of electrolyte includes adding conditioning quantities of a treating agent affording certain metallic sulfates to the formation electrolyte, a rince electrolyte or to a separate solution to obviate the necessity for removing, as by drying, all or substantially all of the electrolytes used to process the battery. Sufficient electrolyte is removed simply by draining, and the resulting battery can be stored for extended periods of time without significantly adversely affecting the performance of the activated battery.

13 Claims, 3 Drawing Figures

Fig. 3

METHOD OF MAKING A LEAD-ACID STORAGE BATTERY, AND CELL, CAPABLE OF ACTIVATION BY THE ADDITION OF ELECTROLYTE

RELATED APPLICATIONS

This is a division of application Ser. No. 486,663 filed July 8, 1974 which is a continuation-in-part of Ser. No. 377,525, now abandoned, filed July 9, 1973.

The application of Sabatino and Rao, Ser. No. 377,563, now abandoned, filed July 9, 1973, for: Battery Vent Seal describes related subject matter.

This invention relates to lead-acid storage batteries; and, more particularly, to a method for assembling such batteries which are capable of being stored and thereafter activated simply by the addition of electrolyte, and to the resulting batteries themselves.

In recent years, considerable attention has been directed to dry charge batteries. This type of battery is formed, the formation electrolyte removed, the battery elements washed to remove any electrolyte residue and dried and then stored. It is ready for use merely by filling with electrolyte. The advantages are numerous; the cost of shipping such batteries is substantially less than "wet" batteries in which the electrolyte adds significantly to the weight of the battery. Also, shelf life is relatively long; and, accordingly, inventory control is facilitated.

The full advantages of the dry charge battery have, however, not been fully realized because of the difficulties and the expense associated with drying the water from the batery elements which is used to remove the electrolyte used in forming the elements. If this is not properly accomplished, chemical and electrochemical reactions can take place which adversely affect the initial battery performance. Thus, for example, oxidation of the negative plate can occur so as to chemically discharge the plate thereby adversely affecting the initial performance of the battery.

For the most part, prior techniques for removing the formation electrolyte have been directed to thoroughly washing and drying the battery element after formation or charging so as to prevent the battery from losing its charge during storage. Thus, U.S. Pat. No. 2,880,520 uses a high velocity air stream. After drying, the battery elements are installed into battery containers, electrically connected and a cover bonded onto the container. U.S. Pat. No. 3,314,158 discloses installing the battery elements into the battery container and making the electrical connections prior to the formation, washing with water and drying steps. After the formation, a heated, nonoxidizing gas is impinged onto the top of the battery elements.

A more recent technique, shown in U.S. Pat. No. 3,652,341, discloses assembling the battery elements into the container and making the electrical connections, filling the battery cells with a forming electrolyte and then charging the battery elements. About 70 to 97 weight percent of the forming acid is then removed by applying an accelerative force, such as a centrifugal force, to the battery.

While these techniques have achieved some success, the employment of such techniques adds to the manufacturing costs and lessens the economic benefits provided by dry charge batteries. Also, these techniques are not always successful in providing a dry charge-type battery which, after extended storage, will exhibit satisfactory performance after being activated by the addition of electrolyte. In addition, the complexity of these techniques could cause quality control problems.

It is accordingly an object of the present invention to provide a simple, inexpensive method for making a dry charge-type storage battery capable of being stored for extended periods of time and thereafter activated merely by the addition of electrolyte.

Another object of this invention provides a method for making such bateries which obviates the necessity for using any apparatus or the like to remove all or substantially all of the forming electrolyte from the battery plates or elements.

Yet another object lies in the provision of a method for making such batteries in which the electrolyte used in forming need only be removed by merely draining the battery container, i.e. — a drain dry battery.

A still further object is to provide storage batteries which, after extended storage and activation by the addition of electrolyte, are substantially free of internal shorts between the battery plates that can cause irreversible damage to the performance of the battery.

Yet another and more specific object lies in the provision of a method for treating a dry charge-type battery which alters the chemical and electrochemical reactions that would otherwise take place.

Another object is to provide a method for making such batteries which greatly simplifies quality control.

A still further object provides a method for making such batteries that is compatible with existing processes for forming wet batteries.

Yet another object of this invention lies in the provision of a method which obviates the need for a washing step and the concomitant neutralization treatment necessary to allow disposal of used wash solutions to avoid possible environment problems.

A further object is to provide a method for forming lead-acid storage batteries which may be stored without the periodic boosting charge required of wet storage batteries that are being stored prior to use.

Other objects and advantages of the present invention will become apparent from the following detailed description, and from the drawings in which.

Figure 1:
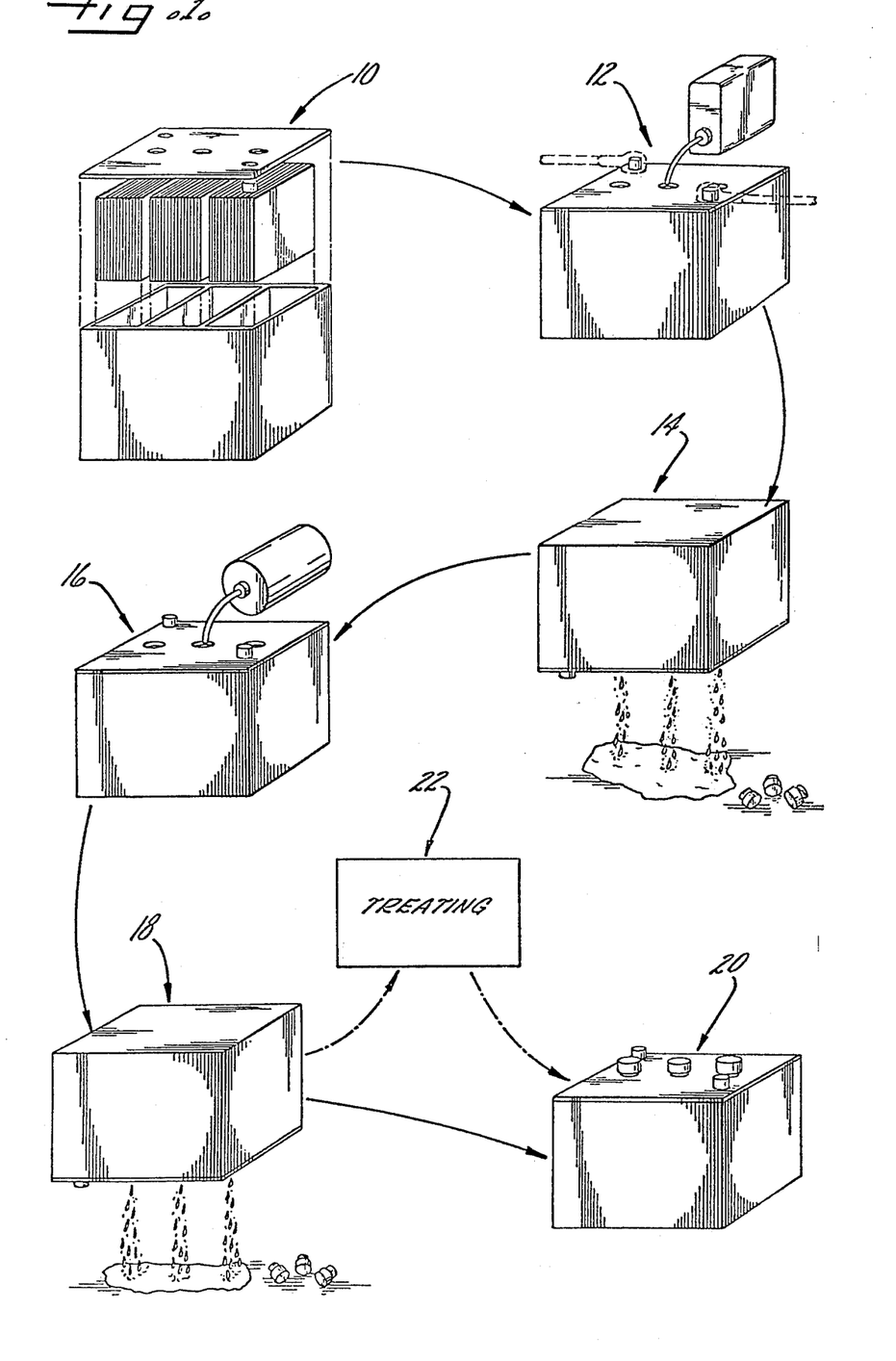
FIG. 1 is a schematic view of a method for making a lead-acid storage battery in accordance with the present invention which is capable of being stored for extended periods and thereafter activated merely by the addition of electrolyte.

While the invention is susceptible to various modifications and alternative forms, there is shown in the FIG. 1 view and will herein be described in detail, the preferred embodiments. It is to be understood, however, that it is not intended to limit the invention to the specific forms disclosed. On the contrary, it is intended to cover all modifications and alternative forms falling within the spirit and scope of the invention as expressed in the appended claims. For example, while the present invention provides advantageous results when used in connection with a method for making lead-acid storage batteries wherein the battery is formed at the source of manufacture, shipped to the dealer without electrolyte and activated at the time of use by merely filling with electrolyte, it should be appreciated that the present invention is equally applicable to any manufacturing process wherein there is any delay in filling the battery with acid electrolyte that would be sufficient to otherwise adversely affect battery performance. More specifically, the method of the present invention is compatible with conventional processes for assembling wet batteries. Accordingly, to simplify inventory control and obviate the need for the periodic boosting charge required by wet batteries during storage, the process of making wet batteries could be interrupted after the formation step; and the batteries conditioned in accordance with this invention prior to storage. As desired, the thus-stored batteries could then be further processed to make fully assembled wet storage batteries. Still further, while FIG. 1 illustrates use of the present invention with a battery wherein the battery elements have been assembled and positioned in the container and the appropriate electrical connections made, the present invention is equally applicable to use for treating the battery plates either before or after the plates have been assembled as battery elements.

In general, the present invention is predicated on the discovery that the formation of lead sulfate crystals or clusters causing internal shorts between the battery or cell plates when not all of the forming electrolyte and wash solutions are removed from the battery or cell can be obviated by processing the battery or cell during manufacture with a specific treating agent in conditioning amounts. This conditioning technique avoids the necessity for completely washing and drying the battery plates or using relatively expensive techniques for removing the electrolyte. Rather, only the electrolyte that can be removed by simply draining the container, e.g. — by inverting and dumping, need be carried out.

Turning now to FIG. 1, the lead-acid battery is first conventionally assembled. As shown at station 10, the battery elements consisting of a plurality of positive and negative plates with separators disposed therebetween are inserted into the cell compartments, and the electrical connections are then made.

The unformed, but fully assembled, battery may then be formed (viz. — charged). Formation electrolyte is added to the battery, and a current is applied thereto as illustrated at station 12. As is well known, the concentration of the formation acid (typically a sulfuric acid solution having a specific gravity ranging from 1.020 to 1.100) and the particular currents applied will vary with the type of forming employed and the battery-type involved.

In a conventional dry charge process, as has been previously described herein, the formation electrolyte is then removed, typically by dumping; and a wash solution is added. After dumping of the wash electrolyte, all the residual electrolyte and wash solution are removed by drying. Washing in water is combined until most of the residual formation acid with the plates and separators is diluted to water. In the process shown in U.S. Pat. No. 3,652,341, the formation electrolyte is partially removed by centrifuging or the like. The amount of the residual electrolyte is critical since an excess can cause internal shorts between the plates upon extended storage.

After removal of the formation electrolyte from contact with the battery plates as shown at station 14, in accordance with one aspect of the present invention, the battery plates are exposed to a rinse electrolyte which adjusts the specific gravity of the residual sulfuric acid so that, when the completed battery is activated after storage, the electrolyte employed for activation can have a specific gravity identical to that utilized with a conventional dry charge battery, yet achieve the industry accepted full charge acid gravity of 1.265. Thus, the battery plates are immersed in a sulfuric acid rinse solution having a specific gravity sufficiently higher than that of the formation electrolyte to raise the specific gravity of the residual sulfuric acid solution remaining on the battery plates (after draining the rinse solution) to the desired level. Typically, the rinse solution will have a specific gravity of about 1.200 to 1.400, the specific level depending principally on the battery size and capacity. As is shown in FIG. 1, the rinse step can be effected merely by filling the container (station 16) with the rinse solution via the vent openings. After allowing sufficient time for the rinse acid to mix with the residual formation acid in the plates, sufficient removal of excess rinse solution is accomplished simply by draining the battery, viz. — by inverting the container and dumping, as indicated at station 18.

It should be appreciated that, while the rinse step provides a definite advantage in allowing use of the identical electrolyte employed for activation of conventional dry charge batteries, this step is optional and can be eliminated if desired. Elimination will, however, of course, necessitate the use of an activation electrolyte with a different specific gravity than used for conventional dry charge batteries, typically higher, if the advantage of using the conventional activation electrolyte is to be realized.

In accordance with a preferred embodiment of the present invention, the treating or conditioning step can be advantageously carried out by incorporation of the treating or conditioning agent in the rinse solution. The treating agent should be added in an amount of from about 0.05 to about 5 per cent (anhydrous metallic sulfate), based upon the weight of the rinse acid solution.

The conditioning agents, pursuant to this invention, comprises a metal sulfate or other metal compound which will yield the sulfate in an aqueous sulfuric acid solution (i.e. — will react in the solution to form the metal sulfate) and which metal sulfates or other compounds are: (1) sufficiently soluble in aqueous sulfuric acid solutions to provide the requisite conditioning quantities of the metal sulfate, (2) are not substantially harmful to either the battery components or to the performance of the battery in use (e.g. — not cause corrosion of the elements as would sodium acetate, gassing or the undesirable effects of the sulfates of iron, nickel, manganese, bismuth, platinum, mercury or chromium and (3) not susceptible to produce a lead salt that would likely precipitate in sufficient amounts which would significantly reduce the porosity of the battery plates.

More particularly, the metallic sulfates of sodium (and its bisulfate), potassium, lithium, magnesium, cadmium, zinc and aluminium have been found to be useful. While each of these materials have been found to be suitable to achieve the conditioning of the batteries in accordance with this invention, it should be appreciated that the advantages derived may vary somewhat depending on the specific material used and the amount employed. From the economic standpoint, sodium sulfate and also zinc sulfate are preferred.

Other sulfates which could be employed include the sulfates of silver and cobalt. Still other sulfates that may be used are the following: $BeSO_4$, $Ce_2(SO_4)_2$, $In_2(SO_4)_3$, $La_2(SO_4)_3$, $SnSO_4$, $Tl_2SO_4$, $Zr(SO_4)_2$ and $Rb_2SO_4$.

Suitable metallic compounds which afford the metallic sulfates in an aqueous sulfuric acid solution and meet the criteria previously set forth include the corresponding hydroxides and oxides. For example, the addition of sodium hydroxide, potassium hydroxide and zinc oxide to form the metallic sulfate treating agent have been found effective to prevent the development of internal shorts within the elements. It is preferred to use the corresponding sulfates since the rates of self-discharge of plates treated with such hydroxides and oxides appears to be slightly variant.

In addition to these other metallic compounds, the hydrated sulfates (i.e. — having waters of crystallization associated therewith) may also be advantageously employed. However, in either instance, the amount of the material used as the treating agent should be adjusted to provide an amount corresponding to the quantity required to afford in the rinse solution the amount of the metal resulting from the use of from about 0.05 to about 5.0 per cent by weight of the anhydrous metallic sulfate.

If desired, mixtures of different materials can suitably comprise the treating agent. Moreover, while certain compounds have been described herein as being unsuitable to function as the treating agent, it should of course be appreciated that these unsuitable materials can be tolerated, within certain limits, so long as their undesirable effects are masked by the presence of the useful treating agent.

To achieve optimum results, the rinse solution containing the treating agent should be allowed to condition the battery plates so that diffusion into the wet battery plates and separators results. This conditioning can be accomplished, for example, by merely allowing the rinse solution to stand in contact with the plates for about 10 minutes or even longer. This soaking is effective to allow the treating agent solution to diffuse and mix with the residual formation electrolyte in the plates. Alternatively, the conditioning may be accomplished by mechanically mixing the rinse solution while it is in contact with the battery plates. Any conventional mechanical mixing means may be advantageously utilized.

Completion of the processing then involves sealing the battery to at least substantially prevent the ingress of air. As illustrated in FIG. 1, this may be carried out by sealing the cover vent openings with suitable closures. The sealed battery is shown at station 20 and may now be stored for extended periods of time. However, while completely sealing the drain dry battery of the present invention may be suitable, it is preferred to only seal the battery sufficiently so that the ingress of air is just substantially prevented. Thus, because the drain dry batteries do retain residual electrolyte, there is some slight internal generation of gases such as hydrogen caused by self-dicharge of the negative active materials during extended storage. If the batteries are totally sealed to protect against oxidation, there can be some bulging of the containers as a result of hydrogen and other gas build-up. In addition, this pressure build-up can result in ejection of the vent caps. If this occurs and the vent caps are not timely replaced, massive self-discharge of the negative plates can result, thus rendering the battery unusable immediately upon addition of electrolyte until the battery is fully recharged. It is therefore preferred to seal the battery in such a fashion that the ingress of air is substantially prevented while permitting the gaseous atmosphere within the battery, after a slight pressure build-up, to be vented from the battery. A particularly desirable means of accomplishing the sealing so as to substantially prevent the ingress of air is described and claimed in the copending applications of Sabatino and Rao, entitled "Battery Vent Seal," assigned to the assignee of this invention, and referred to hereinbefore, wherein the seals for the battery vent openings are provided with a means communicating with the atmosphere such as circular apertures having diameters of from about 0.0005 to 0.006 inch.

In accordance with another embodiment of the present invention, the conditioning agent can be applied during the formation step. Thus, as is illustrated in FIG. 1, the conditioning or treating agent can be included in the formation acid added at station 12. It has been found suitable in this embodiment to include no more than about 2 per cent or less by weight of the formation acid. Further processing then involves draining the formation acid and rinsing, if desired, (with or without addition of further treating agent), followed by draining the rinse solution and then sealing the battery as before.

A still further embodiment involves applying the conditioning agent in a separate step following either draining of the formation acid or, if used, the rinse solution, FIG. 1 showing the latter mode (station 22). The solution containing the conditioning agent is then drained, and the battery is thereafter sealed as before. The conditioning agent can suitably be added in a solvent such as, for example, water in an amount affording from about 0.05 to about 10.0 per cent anhydrous metal sulfate, based upon the weight of the solvent. Also, the conditioning agent may be included in an aqueous sulfuric acid solution, desirably having the same specific gravity as the rinse acid so as to avoid reducing the specific gravity of the residual electrolyte on the battery plates.

When the conditioning agent is added to either the formation electrolyte or in a solvent in a separate step, the treating agent can consist of any of the metallic sulfates or other compounds described in connection with the rinse acid embodiment so long as the criteria set forth therein are observed. Also, as in the rinse acid embodiment, optimum results are achieved by allowing the plates to be conditioned as described therein.

Regardless of the process step in which the treating acid is added, it is important that the amount be sufficient to provide the minimum conditioning required, i.e., — that amount sufficient to substantially prevent internal shorts between the battery plates that cause irreversible damage to the performance of the battery. The amount necessary to achieve this effect will depend upon the step in which the treating agent is added and the amount of dilution which results from the rinse acid or other solutions added. Irrespective of when the treating agent is added, the amount is adequate so long as the residual treating agent upon storage of the formed battery is at least about 0.02 per cent, based upon the total weight of the residual electrolyte in the battery. The exact amount may also vary somewhat depending upon the specific treating agent being utilized; for example, when aluminum sulfate is added to the rinse acid, it should be present in an amount of at least about 0.1% by weight of the rinse acid.

Increased amounts of treating agent, well above the minimum (i.e. — up to about 5% by weight of the solution), can also be suitably used. However, the amount employed should not be so excessive as to significantly adversely affect the battery performance. The battery reserve capacity and cold performance can particularly be affected by excessive amounts of treating agent. Moreover, if the treating agent is added with the formation acid, excessive amounts can impair the ability to reach the desired end-of-charge voltage. The maximum tolerable amount can vary somewhat, depending upon the specific treating agent employed.

The following examples are illustrative, but not in acid or in a separate step after removal of the formation acid from the battery by inverting and dumping. Mechanical mixing was employed in all cases.

After the conditioning, in all cases, the cover vent openings were sealed; and the batteries were stored at 150° F. for 35 days. Following storage, the cover vent openings were unsealed, electrolyte added, a boosting charge given and the battery performance evaluated.

The results are shown in Table I:

Table I

| Battery Number and Treatment | 5 AMP Boosting Following Activation with 1.300 Acid | | 20 Hour Capacities (Hrs.) (Numbers in Parentheses are Internal Resistance (mΩ)) | | | 0° F BCI Performance | |
|---|---|---|---|---|---|---|---|
| | Time Into Boosting (Mins) | End of Charging Voltage (V) | 1st Cycle | 2nd Cycle | 3rd Cycle | 312 Amp Discharge 5 Second Voltage | Time to 7.2V Seconds |
| (1) 2.0% $Na_2SO_4$ in water. | 221 | 16.72 | 22.05 (10.8 mΩ) | 21.6 (10.8 mΩ) | 20.4 (10.8 mΩ) | 7.73 | 61.7 |
| (2) 2.0% $Na_2SO_4$ in rinse acid | 300 | 16.05 | 21.45 (11.5 mΩ) | 21.5 (11.42mΩ) | 20.6 (11.3 mΩ) | 7.63 | 58.1 |
| (3) 10.0% $Na_2SO_4$ in water | 221 | 16.68 | 22.60 (10.8 mΩ) | 21.9 (10.8 mΩ) | 20.77 10.75 mΩ) | 7.74 | 60.9 |
| (4) 10.0% $Na_2SO_4$ in rinse acid | 300 | 15.76 | 22.00 (11.3 mΩ) | 21.6 (11.15 mΩ) | 20.30 (11.1 mΩ) | 7.63 | 53.3 | limitation of the present invention. Unless otherwise specified, all percentages are by weight. The high temperature storage carried out in the examples was used to simulate room temperature conditions that would occur over a longer period of time. The sulfates used as the treating agent were anhydrous unless otherwise specified.

EXAMPLE 1

A Group 24 battery (53 Amp. Hr. capacity) was formed, and the conditioning agent was thereafter applied in varying weight percentages, either to the rinse

EXAMPLE 2

Example 1 was repeated, except that the boosting step was varied, and the formed batteries were stored at 110° F. for 61 days.

The results are shown in Table II:

Table II

| Battery Number and Treatment | 5 Amp Boosting Following Activation with 1.300 Acid | | 20 Hour Capacities (Hrs.) (Numbers in Parentheses are Internal Resistance (mΩ)) | | | 0° F BCI Performance | |
|---|---|---|---|---|---|---|---|
| | Time Into Boosting (Mins) | End of Charging Voltage (V) | 1st Cycle | 2nd Cycle | 3rd Cycle | 312 Amp Discharge 5 Second Voltage | Time to 7.2V Seconds |
| (5) 2.0% $Na_2SO_4$ in water | 180 | 16.59 | 21.2 (11.9 mΩ) | 21.3 (11.8 mΩ) | 20.0 (11.7 mΩ) | 7.53 | 45.0 |
| (6) 2.0% $Na_2SO_4$ in rinse acid | 240 | 16.43 | 19.0 (12.5 mΩ) | 19.7 12.5 mΩ) | 18.35 (12.3 mΩ) | 7.43 | 30.0 |
| (7) 10.0% $Na_2SO_4$ in water | 240 | 16.54 | 21.2 (11.7 mΩ) | 21.0 (12.0 mΩ) | 19.7 (12.0 mΩ) | 7.53 | 45.0 |
| (8) 10.0% $Na_2SO_4$ in rinse acid | 270 | 15.80 | 17.7 (11.8 mΩ) | 17.7 (12.2 mΩ) | 15.8 (12.0 mΩ) | 7.26 | 20.0 |

EXAMPLE 3

Group 24 plastic batteries (62 Amp. Hr.) were formed with an sulfuric acid aqueous formation, and the conditioning agent was added to either the formation acid or to the rinse acid. In all cases, after inverting and dumping to remove the rinse acid, the cover vent openings were sealed; and the batteries were then stored at 110° F. for 21 days.

After opening the cover vent openings, electrolyte was added, and the batteries evaluated. The results are shown in Table III:

Table III

| Battery Number and Treatment | 30° F Activation 290 Amp Discharge 15 Sec. V. Volts | 30° F Activation Time to 7.2V-Sec. | 25A Reserve Capacity Minutes | 0° F Performance 387 Amp Discharge 5 Sec. V. Volts | 0° F Performance Time to 7.2V-Sec. | −20° F Performance 310 Amp Discharge 5 Sec. V. Volts | −20° F Performance Time to 7.2V-Sec. | 25 Amp Reserve Capacity Minutes 1 Cycle | 25 Amp Reserve Capacity 2 Cycle |
|---|---|---|---|---|---|---|---|---|---|
| 1. Formed in a sulfuric acid solution containing 2.0% $Na_2SO_4$. | 8.53 | 83.0 | 95.0 | 7.21 | 6.6 | 7.24 | 7.0 | 93.0 | 92.0 |
| 2. Formed in a sulfuric acid solution containing 0.5% $Na_2SO_4$. | 8.71 | 113.0 | 116.0 | 7.40 | 41 | 7.72 | 50 | 110.0 | 116.0 |
| 3. Treated with a rinse acid containing 2.0% $Na_2SO_4$. | 8.61 | 95.0 | 117.0 | 7.44 | 52 | 7.54 | 34 | 118.0 | 117.0 |
| 4. Treated with a rinse acid containing 0.5% $Na_2SO_4$. | 8.66 | 102.0 | 120.0 | 7.47 | 41 | 7.39 | 35 | 119.0 | 110.0 |
| | Specification 15 Sec. V. 7.2 Volts | | Specification 30 Sec. V. -7.2V | | Specification 30 Sec. V. -7.2V | | Reserve Capacity Rating — 90 min. | | |

EXAMPLE 4

Group 24 batteries (62 Amp. Hr.) were formed using an aqueous sulfuric acid solution. Sodium sulfate in varying quantities was added to the formation acid in each run, and the subsequent processing steps were also varied. Thus, in Run Nos. 2 and 3, after draining of the batteries, these were evacuated at 150° F. for 45 minutes. Also, in Run No. 6, after application of 10 amps. for 7 minutes to the drained batteries, an evacuation at 155° F. for 45 minutes were carried out. Further, after draining of the formation acid in Run Nos. 4–6, a rinse with aqueous sulfuric acid solution was carried out.

The batteries were then, after sealing of the cover vent openings, stored at 110° F. After varying numbers of days, the cover vent openings were unsealed and batteries activated by addition of electrolyte and evaluated. The results are shown in Table IV:

EXAMPLE 5

Group 24 batteries (62 Amp. Hr.) were formed using an aqueous sulfuric acid solution. An aqueous sulfuric acid rinse solution was used in each run, and sodium sulfate in varying quantities was added either to the formation acid or the rinse solution.

The subsequent processing steps were also varied. In Run Nos. 10 and 11, after mechanically mixing the rinse acid solution in the batteries, these batteries were heated in a water bath maintained at 120° F. for 30 minutes, a current of 10 amps. applied for 7 minutes and then evacuated at 150° F. for 45 minutes. In Run No. 7, after draining the rinse solution, a current of 10 amps. was applied for 7 minutes, followed by evacuation at 155° F. for 45 minutes.

After the final processing step (evacuation in Run Nos. 7, 10 and 11 and draining of the rinse solution in Runs 8 and 9), the cover vent openings were sealed; and the batteries stored at 110° F. After varying number of days, the cover vent openings were unsealed, the batteries activated by addition of electrolyte and evaluated. The results are set forth in Table V:

Table IV

| Run No. | Treatment | Storage (Days) | 30° Activation Discharge Rate Amps | 30° Activation 15 Sec.V. | 30° Activation Time to 7.2V Sec. | 20 hr. Capacity Min. | R.C.* Min. | 0° F Cold Test 30 Sec.V. | 0° F Cold Test Time to 7:2V Sec. | −20° F Cold Test 10 Sec.V. | −20° F Cold Test Time to 7.2V Sec. | −20° F Cold Test R.C. Min. | R.C. Min. |
|---|---|---|---|---|---|---|---|---|---|---|---|---|---|
| 1 | 2.0% $Na_2SO_4$ in formation acid | 21 | 290 | 0 | 0 | 1105 | 103 | 7.15 | 26 | 6.93 | 7 | 106 | 102 |
| | | 21 | | | | 1020 | 102 | 7.09 | 19 | 7.13 | 21 | 105 | 95 |
| | | 42 | 290 | 0 | 0 | 1184 | 87 | 7.3 | 40 | 7.18 | 28 | 103 | 106 |
| 2 | 0.5% $Na_2SO_4$ in formation acid with evacuation | 21 | 290 | 0 | 0 | 1103 | 110 | 7.2 | 30 | 7.13 | 21 | 113 | 101 |
| | | 21 | | | | 1185 | 115 | 7.27 | 42 | 7.33 | 50 | 115 | 105 |
| 3 | 2.0% $Na_2SO_4$ in formation acid with evacuation | 21 | 290 | 0 | 0 | 1125 | 109 | 7.03 | 10 | 6.9 | 4 | 110 | 97 |
| | | 42 | 290 | 0 | 0 | 1205 | 85 | — | 15 | 7.12 | 21 | 105 | 106 |
| | | Cut open after being tipped over during 84 days storage at 110° F — negative and positive plates partially discharged; no crystal growth, small amount of sulfate on positive plates | | | | | | | | | | | |
| 4 | 2.0% $Na_2SO_4$ in formation acid with rinse | 21 | 290 | 8.53 | 83 | 960 | 95 | 6.66 | 6 | 6.75 | 7 | 92 | 92 |
| | | 42 | 290 | 8.31 | 80 | 1192 | 87 | — | 10 | 6.49 | 0 | 98 | 99 |
| | | 85 | 266 | 7.36 | 25 | 1062 | 89 | — | 7 | — | 2 | 98 | 98 |
| 5 | 0.5% $Na_2SO_4$ in formation acid with rinse | 21 | 290 | 8.71 | 113 | 1055 | 116 | 7.27 | 41 | 7.42 | 50 | 110 | 116 |
| | | 42 | 290 | 8.42 | 89 | 1205 | 102 | 7.44 | 65 | 7.56 | 48 | 105 | 111 |
| | | 68 | 266 | — | 10 | 1135 | 107 | 7.50 | 65 | 7.59 | 42 | 106 | 110 |
| 6 | 2.0% $Na_2SO_4$ in formation acid with rinse and evacuation | 21 | 290 | 8.59 | 74 | 915 | 90 | 6.77 | 7 | 6.62 | 3 | 92 | 90 |
| | | 42 | 290 | 8.28 | 63 | 1105 | 83 | — | 10 | 6.62 | 5 | 93 | 95 |
| | | 95 | 266 | 7.63 | 47 | 1055 | | | | | | | |

*R.C. = Reserve Capacity

Table V

| Run No. | Treatment | Storage (Days) | Discharge Rate Amps | 30° F. Activation 15 Sec.V. | Time to 7.2V Sec. | 20 Hr. Capacity Min. | R.C. Min. | 0° F Cold Test 30 Sec.V. | Time to 7.2V Sec | −20° F Cold Test 30 Sec.V. | Time to 7.2V Sec. | R.C. Min. | R.C. Min. |
|---|---|---|---|---|---|---|---|---|---|---|---|---|---|
| 7* | Formation acid containing 0.5% Na₂SO₄ | 21 | 290 | 8.80 | 121 | 1142 | 115 | 7.35 | 55 | 7.5 | 41 | 118 | 115 |
|  |  | 42 | 290 | 8.41 | 82 | 1248 | 104 | 7.37 | 55 | 7.44 | 48 | 113 | 114 |
|  |  | 82 | 266 | 7.19 | 15 | — | 107 | 7.43 | 55 | 7.52 | 47 | 114 | 111 |
| 8 | Rinse acid containing 2.0% Na₂SO₄ | 21 | 290 | 8.61 | 95 | 900 | 117 | 7.35 | 55 | 7.29 | 35 | 118 | 117 |
|  |  | 42 | 290 | 8.39 | 78 | 1189 | 102 | 7.43 | 65 | 7.1 | 49 | 111 | 112 |
|  |  | 68 | 266 | 7.69 | — | 1106 | 113 | 7.53 | 65 | 7.43 | 35 | 112 | 110 |
| 9 | Rinse acid containing 0.5% Na₂SO₄ | 21 | 290 | 8.66 | 102 | 1080 | 120 | 7.29 | 42 | 7.22 | 35 | 119 | 110 |
|  |  | 42 | 290 | 8.27 | 53 | 1220 | 123 | 7.40 | 60 | 7.47 | 50 | 116 | 110 |
|  |  | 68 | 266 | 7.35 | 23 | 1154 | 107 | 7.48 | 59 | 7.43 | 37 | 114 | 112 |
| 10* | Rinse acid containing 2.0% Na₂SO₄ | 21 | 290 | 8.83 | 113 | 1156 | 124 | Bad terminal cut open |  |  |  |  |  |
|  |  | 42 | 290 | 8.40 | 70 | 1270 | 105 | 7.48 | 65 | 7.59 | 58 | 112 | 114 |
|  |  | 68 | 266 | 7.46 at 5 Sec. would not accept current | — | 1118 | 113 | 7.49 | 62 | 7.48 | 39 | 112 | 110 |
| 11* | Rinse acid containing 0.5% Na₂SO₄ | 21 | 290 | 3.85 | 105 | 1131 | 120 | 7.32 | 50 | 7.39 | 40 | 114 | 114 |
|  |  | 42 | 290 | 8.32 | 60 | 1245 | 105 | 7.47 | 65 | 7.5 | 47 | 115 | 118 |
|  |  | 82 | 290 | 0.98 at 5 seconds would not accept current | — | 1177 | 108 | 7.52 | 64 | 7.51 | 40 | 115 | 112 |

*evacuation step included

EXAMPLE 6

Group 24 batteries (62 Amp. Hr.), a Group 24 battery (53 Amp. Hr.) and a Group 22 battery (53 Amp. Hr.), all fully assembled with the covers bonded to the containers, were filled with an aqueous sulfuric acid formation electrolyte having a specific gravity of 1.060. The batteries were filled through the cover vent openings to the bottom of the vent openings.

The batteries were then charged using D. C. current with the current level depending upon the battery capacity (viz. — 53 Amp. Hr. — 7 amps; 62 Amp. Hr. — 8 amps). This was continued for about 12 hours, after which the current level was dropped (53 Amp. Hr. — 4 amps; 62 Amp. Hr. — 5). The reduced current level was maintained for about 6 hours, and forming was completed by further reducing the current to 3 amps for about 1 to 3 hours.

After completion of the formation, the formation acid was drained from the batteries. An sulfuric acid aqueous rinse solution was then added, filling to about the bottom of the cover vent openings. About 0.5 per cent anhydrous sodium sulfate, based upon the weight of the rinse solution, was added thereto; and conditioning was carried out by mixing or soaking.

The rinse solution was then dumped by inverting the batteries and draining. The cover vent openings were sealed; and the batteries stored at 110° F. for a varying number of days. After storage, the cover vent openings were unsealed; and the batteries activated by the addition of electrolyte and thereafter evaluated.

The results are shown in Table VI:

Table VI

| Battery No. | Battery Type and Process Description | No. of Days Stored | 30° F. Activation Discharge Rate- 290 AMPS 5 Sec. V. | 15 Sec. V. | Time to 7.2V. Sec. | 25 AMP Reserve Capacity Mins. | 0° F. Performance Discharge Rate- 387 AMPS 5 Sec. | 30 Sec. V. | Time to 7.2V. Sec. | −20° F. Performance Discharge Rate- 310 AMPS 5 Sec. V. | 30 Sec. V. | Time to 7.2V. Sec. | 25 AMP Preserve Capacity Mins. Cycle 1 | Cycle 2 |
|---|---|---|---|---|---|---|---|---|---|---|---|---|---|---|
| 1 | Group 24 (62A.H.) 1.200 rinse acid-mechanical mixing | 68 | 7.78 | 7.76 | 53.0 | 128.0 | 7.39 | 7.31 | 40.0 | 7.35 | 7.20 | — | 131.0 | 132.0 |
| 2 | Group 24 (62A.H.) 1.200 rinse acid-mechanical mixing | 94 | 7.86 | 7.85 | 67.0 | 126.0 | 7.38 | 7.27 | 40.0 | 7.39 | 7.27 | 37.0 | 120.0 | 125.0 |
| 3 | Group 24 (62A.H.)* 1.265 rinse acid- | 70 | 7.63 | 7.61 | 69.0 | 119.0 | 7.33 | 7.20 | 32.0 | 7.55 | 7.29 | 40.0 | 119.0 | 115.0 |

Table VI-continued

| Battery No. | Battery Type and Process Description | No. of Days Stored | 30° F. Activation Discharge Rate- 290 AMPS | | | 25 AMP Reserve Capacity Mins. | 0° F. Performance Discharge Rate- 387 AMPS | | | −20° F. Performance Discharge Rate- 310 AMPS | | | 25 AMP Peserve Capacity Mins. | |
|---|---|---|---|---|---|---|---|---|---|---|---|---|---|---|
| | | | 5 Sec. V. | 15 Sec. V. | Time to 7.2V. Sec. | | 5 Sec. V. | 30 Sec. V. | Time to 7.2V. Sec. | 5 Sec. V. | 30 Sec. V. | Time to 7.2V. Sec. | Cycle 1 | Cycle 2 |
| | mechanical mixing | | | | | | | | | | | | | |
| 4 | Group 24 (53A.H.) 1.280 rinse acid - soak 20 mins. | 71 | 8.47 | 8.42 | Discharge at 211 Amps. 54.0 | 80.0 | 7.70 | 7.57 | Discharge at 281 Amps. 65.0 | 7.42 | 7.28 | Discharge at 225 Amps. 38.0 | 93.0 | 91.0 |
| 5 | Group 22 (53A.H.)* 1.280 rinse acid - soak 10 mins. | 86 | 7.99 | 7.95 | Discharge at 211 Amps. 61.0 | 82.0 | 7.63 | 7.50 | Discharge at 281 Amps. 61.0 | 7.40 | 7.30 | Discharge at 225 Amps. 62.0 | 82.0 | 83.0 |

Specifications: (1) 30° F Activation and 0° F and −20° F performance: 7.2 V. at 15 Sec.
(2) Reserve capacity: 53 A.H. - 70 min.: 62 A.H. - 90 min.
*using circular vent seals having a 0.001 inch diameter

EXAMPLE 7

Figure 2:
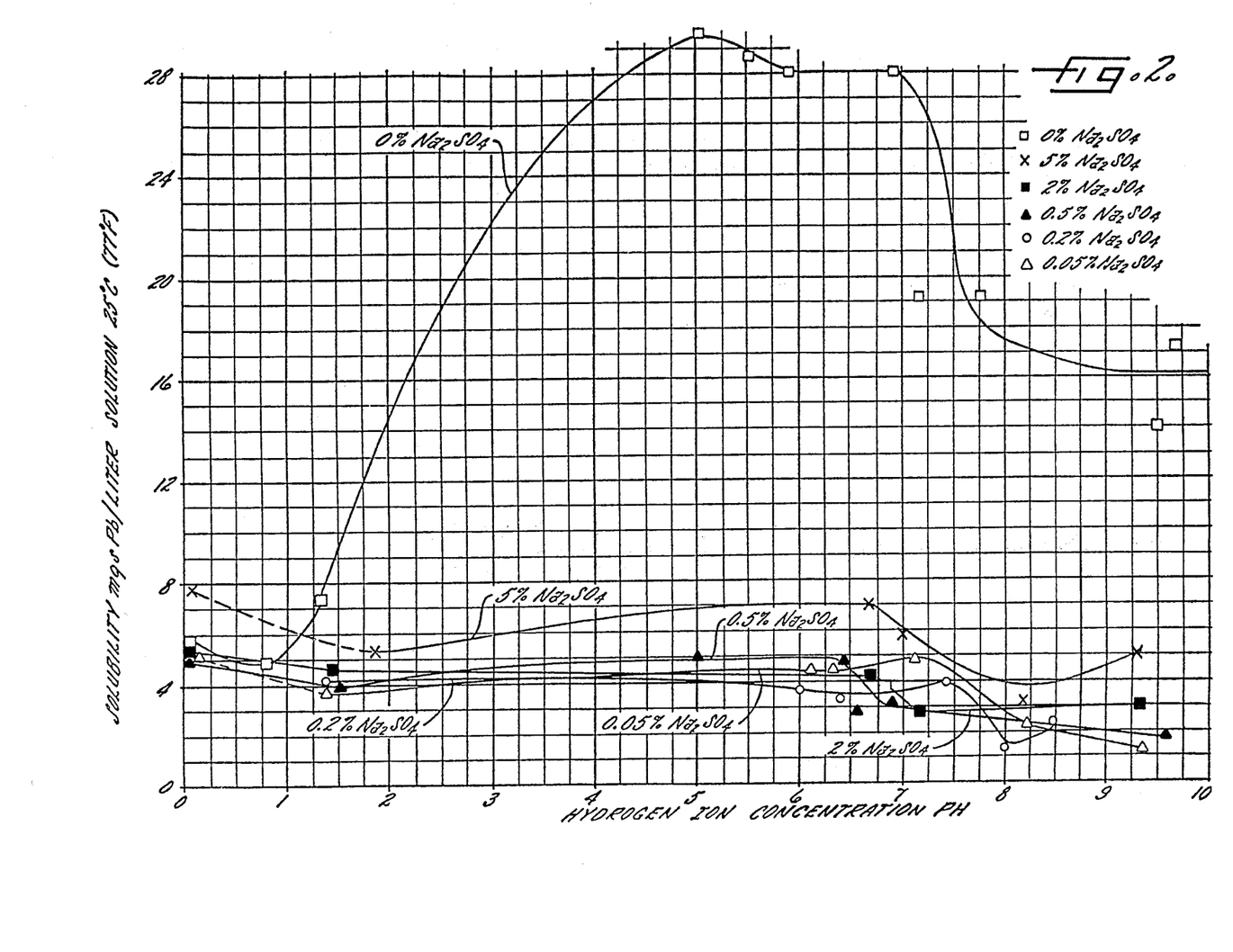
FIG. 2 is a graph of the solubility of lead in a sulfuric acid solution versus the hydrogen ion concentration (pH) of the solution at 25° C. and showing the effects of addition of varying amounts of a treating agent pursuant to the present invention on the lead solubility.
Figure 3:
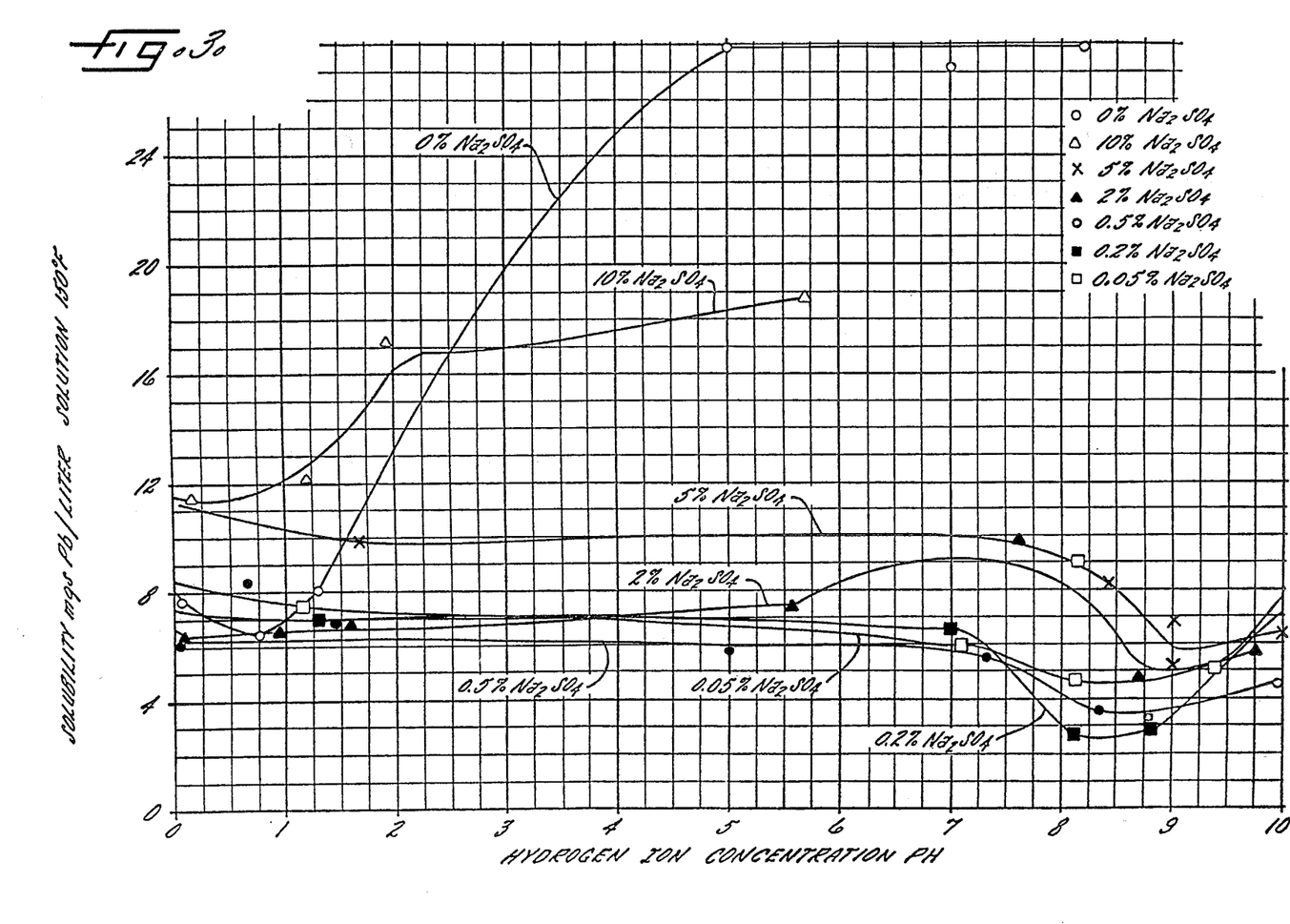
FIG. 3 is a graph similar to FIG. 2 and illustrating the effects at a temperature of about 150° F.

The effect of the addition of varying amounts of sodium sulfate upon the solubility of lead in any form (e.g. — lead sulfate) in sulfuric acid solutions of varying pH is shown in FIGS. 2 and 3.

Two liters of each of the various solutions were prepared in Erlenmeyer flasks. One liter of each solution was tested at room temperature (77° F.) and the other at about 150° F. as will hereinafter be described.

To form the solutions having a pH in the range of about 1 or so, varying amounts of sulfuric acid and sodium sulfate were added to distilled water, after which freshly precipitated lead sulfate was added in excess. For solutions having a pH of about 5 or more, varying amounts of sodium sulfate and excess freshly precipitated lead sulfate were added to distilled water.

The solutions were initially heated at temperatures 15° to 30° F. higher than the nominal temperatures desired (viz. — 77° F. or 150° F.) and were periodically stirred in contact with the added, excess, solid lead sulfate to approach saturation at the higher temperatures for about 8 hours and then allowed to stand at the nominal temperature for about 64 hours.

The solubility of the lead in the solutions at 77° F. was carried out by filtering the solution using a fritted Buchner funnel, and the lead in the resulting saturated solution is determined by atomic absorption. The quantity of lead in the 150° F. solutions was determined by first heating the flask and Buchner funnel to 150° F. and filtering the solution into the flask. It was observed that some cooling had occurred, and EDTA was added to re-solubilize the precipitated lead compounds; however, some inherent error may well be involved. The amount of lead in solution in the resulting filtered solution was then measured by atomic absorption.

The pH of the various solutions was determined at room temperature.

As can be seen from FIGS. 2 and 3, the addition of sodium sulfate to the sulfuric acid solutions significantly depresses the solubility of lead (as lead sulfate and other lead compounds) in the solutions. It is theorized that the lessening of these lead compounds in solution may account, at least in part, for the results achieved by this invention due to a lessening of the likelihood of precipitation of lead sulfate and the like and the concomitant crystal growth that can eventually lead to internal shorts in a battery if the crystal growth bridges between adjacent plates.

EXAMPLE 8

A number of cells (53 Amp. Hr. automotive-type elements) were fully assembled, conventionally formed with a sulfuric acid aqueous solution, and different treating or conditioning agents were added to the rinse solution. After inverting and dumping to remove the rinse acid, the cells were substantially sealed with vent seals having about a 1 mil aperture and stored for 93 days at 110° F.

After opening, the cells were visually evaluated; the results are shown in Table VII:

Table VII

| Type and Concentration of Treating Agent | Visual Observation of Elements (Positive and Negative Plates) | Condition of Separator |
|---|---|---|
| 0.1% $Al_2(SO_4)_3$ | Growth of large sulfate crystals on positive plates. Shorted cells | Holes in separators- short through separator |
| 0.25% $Al_2(SO_4)_3$ | No large sulfate crystals on the surface of positive plate | Good |
| 0.4% $Al_2(SO_4)_3$ | No large sulfate crystals on the surface of positive plate | Good |
| 0.2% $CdSO_4$ | Small sulfate crystals on the surface of positive plate | Good |
| 0.5% $CdSO_4$ | Positive plates in excellent condition without large sulfate crystal growth | Good |
| 0.8% $CdSO_4$ | Positive plates in excellent condition without large sulfate crystal growth | Very good |
| 0.1% $K_2SO_4$ | Positive plates in very good condition without large sulfate crystal growth | Good |
| 0.2% $K_2SO_4$ | Some small sulfate crystals. (Would | Good |

Table VII-continued

| Type and Concentration of Treating Agent | Visual Observation of Elements (Positive and Negative Plates) | Condition of Separator |
| --- | --- | --- |
| | not have caused damage) | |
| 0.4% K$_2$SO$_4$ | Positive plates in excellent condition without sulfate crystal growth | Very good |
| 0.1% Li$_2$SO$_4$ 0.5% Li$_2$SO$_4$ 0.8% Li$_2$SO$_4$ | Positive plates in excellent condition without sulfate crystal growth | Excellent |
| 0.1% MgSO$_4$ | Positive plates exhibit small sulfate growth | Good |
| 0.4% MgSO$_4$ | Some sulfate crystals on the positive plate | Good |
| 0.6% MgSO$_4$ | Positive plates in good condition without sulfate crystal growth | Good |
| 0.1% ZnSO$_4$ 0.2% ZnSO$_4$ | Positive plates in excellent condition without sulfate crystal growth | Excellent |
| 0.4% ZnSO$_4$ | Positive plates in good condition without sulfate crystal growth | Good |
| 0.5% Na$_2$SO$_4$ | Positive plates in good condition without sulfate crystal growth | Good |
| No additive | Positive plates exhibit large sulfate growth at frame bars. Such growth can cause shorts | Good |

EXAMPLE 9

Group 24 plastic batteries (62 Amp. Hr.) were formed with a sulfuric acid aqueous 20 hr. formation, and various amounts and types of treating agents were added to the rinse acid. After inverting and dumping to remove the rinse acid, the cover vent openings were substantially sealed using vent seals having a channel vent opening therein; and the batteries were stored at 110° F. for 104 days or more.

After opening the cover vent openings, electrolyte was added; and the batteries were evaluated. The results are shown in Table VIII:

EXAMPLE 10

Group 24 plastic batteries (62 Amp. Hr.) were formed using a sulfuric acid aqueous 20 hr. formation, and various amounts and types of metallic hydroxides and oxides, affording the corresponding sulfate upon addition to an aqueous sulfuric acid solution, were added to the rinse acid. After inverting and dumping to remove the rinse acid, the cover vent openings were substantially sealed as described in Example 9; and the batteries were stored at 110° F. for 82 days or more.

After opening the cover vent openings, electrolyte was added; and the batteries were evaluated. The re- Table VIII

| Type and Concentration of Metallic Sulfate in Rinse Acid | No. of Days of Storage at 110° F. | Open Circuit Voltage Prior to Activation | 30° F Activation 266 AMP Discharge | | | 0° F Cold Performance 355 AMP Discharge | | | Reserve Capacity Minutes |
| --- | --- | --- | --- | --- | --- | --- | --- | --- | --- |
| | | | 5 sec.V. | 15 sec.V. | Time to 7.2V sec. | 5 sec. V. | 30 sec. | Time to 7.2V sec. | |
| 0.5% CdSO$_4$ | 130 | 6.08 | Sample used for Scanning | | | Electron Microscope Examination | | | |
| 0.5% CdSO$_4$ | 137 | 5.53 | 7.98 | 7.95 | 64.0 | 7.70 | 7.51 | 63 | 119 |
| 0.4% K$_2$SO$_4$ | 144 | 9.08 | | | | | | | |
| 0.4% K$_2$SO$_4$ | 144 | 7.27 | | | | | | | |
| 0.4% ZnSO$_4$ | 116 | 7.59 | 8.29 | 8.29 | 88.0 | 7.64 | 7.49 | 61 | 123 |
| 0.4% ZnSO$_4$ | 130 | 8.95 | Sample used for Scanning | | | Electron Microscopic Examination | | | 118 |
| 0.4% Al$_2$(SO$_4$)$_3$ | 129 | 5.85 | 8.22 | 8.19 | 58.0 | 7.76 | 7.58 | 70 | |
| 0.4% Al$_2$(SO$_4$)$_3$ | 110 | 7.17 | 8.50 | 8.51 | 77.0 | 7.58 | 7.41 | 60 | 124 |
| 0.4% MgSO$_4$ | 135 | 4.61 | 7.57 | 7.48 | 35.0 | 7.69 | 7.48 | 63 | 118 |
| 0.4% MgSO$_4$ | 131 | 5.77 | 8.33 | 8.30 | 83.0 | 7.64 | 7.45 | 58 | 121 |
| 0.5% Li$_2$SO$_4$ | 129 | 6.19 | 8.05 | 8.01 | 68.0 | 7.62 | 7.41 | 55 | 120 |
| 0.5% Li$_2$SO$_4$ | 114 | 7.43 | 8.09 | 8.05 | 71.0 | 7.57 | 7.42 | 62 | 114 |
| 0.5% Na$_2$SO$_4$ | 104 | 8.52 | 8.54 | 8.51 | 71.0 | 7.71 | 7.56 | 70 | 115 |
| | | | Specification 15sec.V. 7.2 Volts | | | Specification 30sec.V. 7.2 Volts | | | Reserve Capacity Rating - 90 min. | sults are shown in Table IX:

Table IX

| Type of Additive and Concentration in Rinse Acid | No. of Days of Storage at 110° F. | Open Circuit Voltage Prior to Activation | 30° F Activation Performance 266 AMP Discharge | | | 0° F Cold Performance 355 AMP Discharge | | | Reserve Capacity Minutes | Remarks |
| --- | --- | --- | --- | --- | --- | --- | --- | --- | --- | --- |
| | | | 5 sec. V. | 15 sec. V. | Time to 7.2V sec. | 5 sec. V. | 30 sec. V. | Time to 7.2V sec. | | |
| NaOH to yield 0.5% Na$_2$SO$_4$ | 84 | 11.22 | Battery cut open to determine sulfation | | | | | | | Some sulfate bead or crystal growth in the bottom of the positive plate grid frame bar. Not resulted in shorting yet |
| | 82 | 8.41 | 7.52 | 7.50 | 50 | 7.81 | 7.62 | 77.0 | 120 | Exhibited varying degrees of sulfation from cell to cell in the same battery. After activation, acid gravity varied from |

Table IX-continued

| Type of Additive and Concentration in Rinse Acid | No. of Days of Storage at 110° F. | Open Circuit Voltage Prior to Activation | 30° F Activation Performance 266 AMP Discharge | | | 0° F Cold Performance 355 AMP Discharge | | | Reserve Capacity Minutes | Remarks |
|---|---|---|---|---|---|---|---|---|---|---|
| | | | 5 sec. V. | 15 sec. V. | Time to 7.2V sec. | 5 sec. V. | 30 sec. V. | Time to 7.2V sec. | | |
| KOH to yield 0.4% K₂SO₄ | 84 | 11.32 | Battery cut open to determine sulfation | | | | | | | 1.205 to 1.250 Sulfate deposit - randomly on positive plate |
| | 82 | 11.00 | 7.98 | 7.98 | 74 | 7.92 | 7.77 | 82.0 | 121 | Exhibited varying degrees of sulfation from cell to cell in the same battery. After activation, acid gravity varied from 1.197 to 1.247 |
| ZnO to yield 0.3% ZnSO₄ | 84 | 9.81 | Battery cut open to determine sulfation | | | | | | | Sulfation of positive plate and frame bars |
| | 82 | 7.80 | 150 AMPS — Failed at 266 Amps | 8.50 | 188 | 7.79 | 7.60 | 74.0 | 132 | Exhibited varying degrees of sulfation from cell to cell in the same battery. After activation, acid gravity varied from 1.215 to 1.245 |

EXAMPLE 11

Various capacity, plastic heavy duty, six volt batteries, typically used for golf carts, and having separators with glassmat backs, were formed using a sulfuric acid aqueous 20 hr. formation. About 0.5% by weight of sodium sulfate was added to the rinse acid (specific gravity —1.347). After inverting and dumping to remove the rinse acid (about 50 to 60 volume per cent of the acid being retained due to the porous type of separators used), the cover vent openings were substantially sealed as described in Example 8; and the batteries were stored at temperatures ranging from 72° to 110° F. for from 61 to 302 days.

After opening the cover vent openings, electrolyte was added; and the batteries were evaluated. The results are shown in Table X:

Thus, as has been seen, the present invention provides a novel lead-acid storage battery which can be stored for extended periods of time and is capable of being activated by the addition of electrolyte, serving as a replacement for conventional dry charge batteries. The invention further provides a drain dry process for forming such batteries which obviates the necessity for drying the battery to remove all the residual formation electrolyte or using relatively complex techniques such as centrifuging to remove most of the electrolyte. Adequate electrolyte is removed simply by draining. The process is versatile and may be used even with batteries whose elements retain up to 50 or 60 volume per cent of the acid added.

As is apparent from the description provided herein, the conditioning treatment in accordance with the present invention serves to protect the battery during stor-

Table X

| Battery Type | Reaction Time with Rinse Acid in Minutes | No. of Days and Temperature of Storage | Open Circuit Voltage | Status of Battery and Observations |
|---|---|---|---|---|
| 220 AH | 40 | 61 days - 110° F | 3.88 | No sulfate crystals were observed on the positive plates. Internal shorts were absent. Separators were in good condition |
| 220 AH | 40 | 61 days - 110° F | 4.85 | Retained 57.0% of the original capacity following storage. Battery regained its rated capacity in subsequent cycling. Battery okay on Life Cycle test |
| 220 AH | 40 | 302 days - 82° F | 3.23 | Retained 34.0% of the original rated capacity following storage. Battery regained its rated capacity in subsequent cycling |
| 180 AH | 10 | 139 days - 110° F | 3.69 | Retained 39.0% of the original rated capacity following storage; battery regained its rated capacity during subsequent cycling |
| 180 AH | 20 | 131 days - 110° F | 5.58 | |
| 180 AH | 20 | 131 days - 80° F | 5.93 | |
| 180 AH | 20 | 131 days - 72° F | 5.99 | |
| 180 AH | 30 | 131 days - 110° F | 5.58 | |
| 220 AH | 10 | 131 days - 110° F | 5.38 | |
| 220 AH | 20 | 131 days - 110° F | 5.31 | |
| 220 AH | 20 | 131 days - 80° F | 5.89 | |
| 220 AH | 20 | 131 days - 72° F | 5.94 | |
| 220 AH | 30 | 135 days - 110° F | 3.24 | Retained 35.0% of the original rated capacity following storage; batery regained its rated capacity during subsequent cycling | age from the growth of crystals and clusters of crystals which can bridge between adjacent positive and negative plates to create internal shorts, thereby irreversibly damaging the battery. It is this problem which has dictated, prior to this invention, the removal of at least substantially all of the electrolyte before storage in dry charge or dry charge-type batteries.

While it is not fully understood how the conditioning step of the drain dry process of this invention functions to so protect the battery elements, it is theorized that the kinetics and the morphology of the products of the chemical and electrochemical reactions that take place during storage are altered. During storage, due to the self discharge of the positive plates by sulfation occurring at a more rapid rate than at the negative plates, a condition not occurring in a wet battery, acid gradients are created.

It is accordingly hypothesized that, as can be seen from FIGS. 2 and 3, the conditioning treatment of the soluble metal sulfate decreases the solubility of lead compounds in the residual electrolyte solution in the battery and maintains substantially the same solubility of the lead compounds during the critical periods as the sulfuric acid is consumed by reacting with the active materials on the plates, forming lead sulfate and increasing the pH of the electrolyte up to a neutral level. The low solubility achieved at the initial acidic pH levels alters the kinetics of the crystal growth, and the maintenance of substantially this same solubility level during the entire course of pH change prevents precipitation of the lead sulfate or other compounds that would otherwise occur at interfaces created between the acid gradients, which precipitation is thought to accelerate the growth of crystals or clusters of crystals that lead to the undesirable bridging between the plates.

We claim as our invention:

1. A method of treating the plates to be used in a lead-acid storage battery including a container having a plurality of cell compartments and a plurality of battery elements consisting of a plurality of positive and negative plates with separators positioned therebetween, the battery elements being electrically connected, to provide a battery capable of being stored and thereafter activated by the addition of electrolyte which comprises:
    a. forming said plates by bringing said plates into contact with a formation electrolyte and applying current thereto,
    b. draining the formation electrolyte from contact with said plates,
    c. bringing said plates into contact with a treating solution affording under the conditions of contact a soluble metallic sulfate in an amount sufficient to condition said plates,
    d. draining the treating solution from contact with said plates and
    e. sealing the battery with the battery elements positioned therein to at least substantially prevent the ingress of air.

2. The method of claim 1 wherein said plates are fashioned into battery elements prior to carrying out step (a).

3. The method of claim 1 wherein said plates are fashioned into battery elements, are positioned in the battery container and are electrically connected prior to carrying out step (a).

4. The method of claim 3 wherein the metallic sulfate is sodium sulfate.

5. A method for making a lead-acid storage battery capable of being stored and thereafter activated by the addition of electrolyte and including a container having a plurality of cell compartments and a plurality of battery elements consisting of positive and negative plates with separators therebetween, the battery elements being electrically connected, which comprises:
    a. providing the battery,
    b. forming the battery elements by filling the cell compartments with a formation electrolyte and applying current thereto,
    c. draining the formation electrolyte from the cell compartments,
    d. filling the cell compartments with an aqueous solution,
    e. draining the aqueous solution from the cell compartments,
    f. adding a treating agent in an amount sufficient to condition the battery elements in at least one of steps (b) and (d), with the proviso that, when the treating agent is added in step (b), steps (d) and (e) may be eliminated, said treating agent affording, under the conditions of treating, a soluble metallic sulfate and
    g. sealing the battery to at least substantially prevent the ingress of air.

6. The method of claim 5 wherein a rinse electrolyte is added to the cell compartments following step (c) and is thereafter drained.

7. The method of claim 5 wherein said treating solution includes sodium sulfate.

8. The method of claim 6 wherein said treating agent is sodium sulfate.

9. The method of claim 6 wherein said treating agent is added in said rinse electrolyte and steps (d) and (e) are eliminated.

10. The method of claim 8 wherein said treating agent is added to the formation electrolyte in an amount of no greater than about 2.0 per cent by weight.

11. The method of claim 9 wherein said treating agent is sodium sulfate and is added in an amount of from about 0.05 to about 5.0 per cent by weight.

12. A method of treating the plates to be used in a lead-acid cell including a container and a plurality of positive and negative plates with separators positioned therebetween, the cell being electrically connected, to provide a cell capable of being stored and thereafter activated by the addition of electrolyte which comprises:
    a. forming said plates by bringing said plates into contact with a formation electrolyte and applying current thereto,
    b. draining the formation electrolyte from contact with said plates,
    c. bringing said plates into contact with a treating solution affording under the conditions of contact a soluble metallic sulfate in an amount sufficient to condition said plates,
    d. draining the treating solution from contact with said plates and
    e. seaing the cell with the plates and separators positioned therein to at least substantially prevent the ingress of air.

13. A method for making a lead-acid cell capable of being stored and thereafter activated by the addition of electrolyte and including a container having a plurality of positive and negative plates with separators therebetween, the cell being electrically connected, which comprises:
   a. providing the cell,
   b. forming the plates by filling the cell container with a formation electrolyte and applying current thereto,
   c. draining the formation electrolyte from the container,
   d. filing the container with an aqueous solution,
   e. draining the aqueous solution from the container,
   f. adding a treating agent in an amount sufficient to condition the plates and separators in at least one of steps (b) and (d), with the proviso that, when the treating agent is added in step (b), steps (d) and (e) may be eliminated, said treating agent affording, under the conditions of treating, a soluble metallic sulfate and
   g. sealing the cell to at least substantially prevent the ingress of air.

* * * * *